United States Patent
Kelm et al.

(10) Patent No.: US 10,496,572 B1
(45) Date of Patent: Dec. 3, 2019

(54) INTRACLUSTER AND INTERCLUSTER INTERPROCESSOR INTERRUPTS INCLUDING A RETRACT INTERRUPT THAT CAUSES A PREVIOUS INTERRUPT TO BE CANCELED

(71) Applicant: Apple Inc., Cupertino, CA (US)

(72) Inventors: John H. Kelm, Belmont, CA (US); Bernard J. Semeria, Palo Alto, CA (US); Joshua P. de Cesare, Campbell, CA (US); Shih-Chieh Wen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 15/450,115

(22) Filed: Mar. 6, 2017

(51) Int. Cl.
*G06F 13/24* (2006.01)
*G06F 1/3287* (2019.01)

(52) U.S. Cl.
CPC ............ *G06F 13/24* (2013.01); *G06F 1/3287* (2013.01)

(58) Field of Classification Search
None
See application file for complete search history.

(56) References Cited

U.S. PATENT DOCUMENTS

| | | | |
|---|---|---|---|
| 6,148,361 A * | 11/2000 | Carpenter | G06F 9/4812 710/260 |
| 7,430,673 B2 | 9/2008 | Kardach et al. | |
| 8,356,130 B2 | 1/2013 | Strauss et al. | |
| 8,504,753 B2 | 8/2013 | Danko | |
| 9,298,504 B1 | 3/2016 | Vincent | |
| 9,329,671 B2 | 5/2016 | Heinrich et al. | |
| 2014/0215236 A1* | 7/2014 | Heinrich | G06F 1/329 713/320 |
| 2014/0372786 A1 | 12/2014 | Wohlgemuth et al. | |
| 2016/0077987 A1 | 3/2016 | Kumar et al. | |

* cited by examiner

*Primary Examiner* — Scott C Sun

(74) *Attorney, Agent, or Firm* — Kowert, Hood, Munyon, Rankin & Goetzel, P.C.; Lawrence J. Merkel

(57) ABSTRACT

In an embodiment, processors may have associated special purpose registers (SPRs) such as model specific registers (MSRs), used to communicate IPIs between the processors. In an embodiment, several types of IPIs may be defined, such as one or more of an immediate type, a deferred type, a retract type, and/or a non-waking type. The immediate IPI may be delivered and may cause the target processor to interrupt in response to receipt of the IPI. The deferred IPI may be delivered within a defined time limit, and not necessarily on receipt by the target processor. The retract IPI may cause a previously transmitted IPI to be cancelled (if it has not already caused the target processor to interrupt). A non-waking IPI may not cause the target processor to wake if it is asleep, but may be delivered when the target processor is awakened for another reason.

19 Claims, 5 Drawing Sheets

Computer Accessible Storage Medium 160

Processor Core 162

Fig. 7

INTRACLUSTER AND INTERCLUSTER INTERPROCESSOR INTERRUPTS INCLUDING A RETRACT INTERRUPT THAT CAUSES A PREVIOUS INTERRUPT TO BE CANCELED

BACKGROUND

Technical Field

Embodiments described herein are related to processors and, more particularly, to interprocessor interrupt handling in electronic systems including processors.

Description of the Related Art

Many systems today include multiple processors that can perform a given computing task. The processors need not be identical (e.g. they may be designed for different power/performance points, for example) but generally are designed to execute the same instruction set and can be assigned to perform the same tasks. Scheduling software (e.g. part of the operating system kernel for the system) can assign tasks to various processors. In some cases, higher level software such as an application can assign tasks (e.g. threads of the application) with the support of the scheduling software.

One mechanism for informing another processor that it has been assigned to perform a task is an interprocessor interrupt (IPI). As the name implies, an IPI is generated by one processor (the "source processor") and targets another processor for interrupt (the "target processor"). The source processor can be executing the scheduling software at the time the task is assigned. The target processor may or may not be executing a task at the time, and can be in a low power mode ("sleeping").

IPIs have been generally been implemented as part of the external interrupt mechanism in an electronic system. Such an implementation requires the IPI to have all the behaviors and requirements of other external interrupts, which may not be desirable for IPIs. Additionally, the external interrupts are gathered and prioritized in an interrupt controller, typically separate from the processor. The latency to transmit an IPI from the source processor to the interrupt controller, and subsequently reflect the IPI back to the target processor from the interrupt controller, may also be undesirable. For example, the latency may impact the size of a task that may be economical to assign to another processor. If the task is not large enough, the latency and overhead of the IPI may not be justified.

SUMMARY

In an embodiment, one or more processors may have associated special purpose registers (SPRs) such as model specific registers (MSRs). The MSRs may be used to communicate IPIs between the processors, thus creating a mechanism separate from the interrupt controller for IPIs. The latency for transmitting IPIs from the source processor to the target processor may be reduced, in some embodiments. For example, processors in the same cluster (e.g. sharing a common lower level cache and/or a common connection to a remaining portion of the system) may have low latency transmission of IPIs.

In an embodiment, several types of IPIs may be defined. For example, in an embodiment, the types may include one or more of an immediate type, a deferred type, a retract type, and/or a non-waking type. The immediate IPI may be delivered and may cause the target processor to interrupt in response to receipt of the IPI. The deferred IPI may be delivered within a defined time limit, and not necessarily on receipt by the target processor. The retract IPI may cause a previously transmitted IPI to be cancelled (if it has not already caused the target processor to interrupt). A non-waking IPI may not cause the target processor to wake if it is asleep, but may be delivered when the target processor is awakened for another reason. The different types may allow flexibility for software in the manner in which IPIs are used.

BRIEF DESCRIPTION OF THE DRAWINGS

The following detailed description makes reference to the accompanying drawings, which are now briefly described.

FIG. 7 is a block diagram of one embodiment of a computer accessible storage medium.

Figure 1:
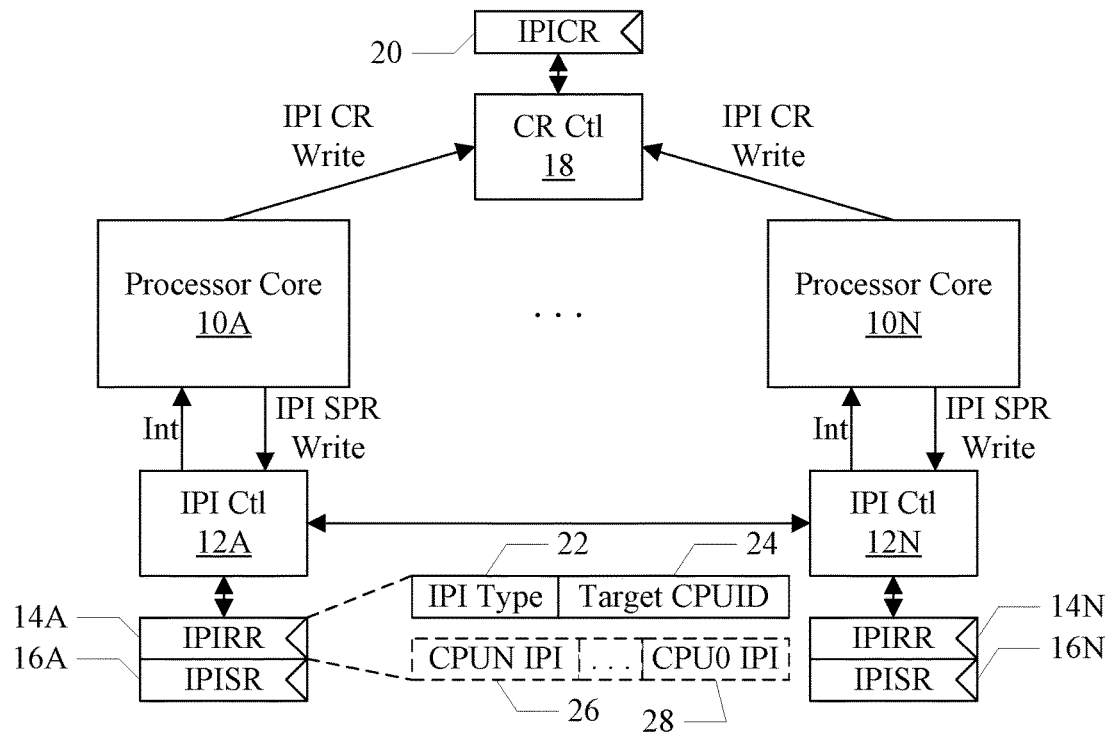
FIG. 1 is a block diagram of one embodiment of a cluster including multiple processor cores.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of multiple processor cores (e.g. processor cores 10A-10N), corresponding IPI control circuits 12A-12N, IPI request registers (IPIRRs) 14A-14N, IPI status registers (IPISRs) 16A-16N, count register control circuit 18, and an IPI count register (IPICR) 20. The processor cores 10A-10N are coupled to respective IPI control circuits 12A-12N, which are coupled to respective IPIRRs 14A-14N and IPISRs 16A-16N. IPI control circuits 12A-12N are coupled to each other. The processor cores 10A-10N are coupled to the count register control circuit 18, which is coupled to the IPICR 20.

The IPI control circuits 12A-12N are configured to control the interrupt of processor cores 10A-10N for IPIs. Other types of interrupts may be handled by an interrupt controller (not shown in FIG. 1). The other types of interrupts may include, e.g., external interrupts generated by various peripheral devices in a system. In an embodiment, the IPI control circuits 12A-12N are coupled to an interrupt input to the respective processor core 10A-10N (Int in FIG. 1). The interrupt input may be dedicated to the IPI control circuits 12A-12N, or may be shared with another interrupt source, in various embodiments. To interrupt the processor core 10A-10N, the IPI control circuits 12A-12N may assert a signal on the interrupt input. Asserting the interrupt to the processor core 10A-10N may be referred to as delivering the interrupt to the processor core 10A-10N. The processor core 10A-10N may respond to the interrupt, stopping execution of a current instruction stream and initiating instruction execution from a memory location specified for interrupts based on the instruction set architecture implemented by the processor cores 10A-10N. The specified location is often referred to as an "interrupt vector." If the instruction set architecture specifies the saving of some or all processor state prior to initiating the interrupt vector execution, the processor cores 10A-10N may write the processor state to memory.

The processor cores 10A-10N may write the IPISR register 16A-16N as part of beginning interrupt vector execution (either automatically by the processor hardware or in response to one of the instructions at the interrupt vector). The update of the IPISR register 16A-16N may cause the IPI control circuit 12A-12N to deassert the interrupt input to the processor core 10A-10N unless another IPI has been received for the same processor core 10A-10N.

The IPI control circuits 12A-12N may be configured to receive IPI SPR writes from the respective processor cores 10A-10N as well. The IPI SPR writes may include writes targeted at the IPIRRs 14A-14N and/or the IPISRs 16A-16N. A source processor core 10A-10N may request an IPI of a target processor core 10A-10N by writing the IPIRR 14A-14N corresponding to the source processor core 10A-10N. The IPIRR 10A is shown in exploded view in FIG. 1, and illustrates that the IPIRR 10A may include an IPI type field 22 and a target CPUID field 24. The target CPUID field 24 may be written with an indication of the target processor core 10A-10N. In an embodiment, each processor core 10A-10N may include a unique identifier that identifies the processor core 10A-10N among the processor cores 10A-10N. The CPUID may be hardwired in each processor core 10A-10N, or may be programmable (e.g. during boot, the processors 10A-10N may be enumerated and assigned CPUIDs by the software executed during boot).

The IPI type field 22 may by written with an IPI type for the requested IPI. There may be various types in various embodiments. For example, in an embodiment, the IPI types may include immediate, deferred, retract, and non-waking. Other embodiments may implement any subset of the above types, additional types, and/or a subset of the types and additional types.

The immediate type may be an IPI that is transmitted to the target processor core 10A-10N, and that may cause the target processor core 10A-10N to be interrupted upon receipt of the IPI. That is, there may be no expected delay in asserting the interrupt input to the target processor core 10A-10N other than the transmission of the IPI to the IPI control circuit 12A-12N coupled to the target processor core 10A-10N and the processing of the received IPI at the IPI control circuit 12A-12N. There may be a delay (e.g. if interrupts are masked in the target processor core 10A-10N, the target processor core 10A-10N needs time to arrive at an interruptible point, etc.), but the delay may be unrelated to operation of the IPI control circuits 12A-12N.

The deferred type may be an IPI that has an associated delay. The delay may be specified, e.g., in the IPICR 20. An IPICR write may precede the deferred IPI request, writing a value representing the delay to the IPICR 20. The delay may be measured in clock cycles of the clock to the processor cores 10A-10N (not shown in FIG. 1) or a different clock (e.g. a reference clock input to an integrated circuit that includes the apparatus of FIG. 1), or may be measured in increments of time (e.g. nanoseconds, microseconds, milliseconds, etc.). The deferred IPI may interrupt the target processor core 10A-10N no later than the expiration of the delay in the IPICR 20. The deferred IPI may interrupt the target processor sooner than the delay, in some embodiments. For example, if the target processor core 10A-10N is idle or would otherwise enter a low power state in which instructions are not executed, the IPI control circuit 12A-12N coupled to the target processor core 10A-10N may interrupt the target processor core 10A-10N prior to expiration of the delay. Viewed in another way, a deferred IPI may be intentionally delayed by the IPI circuits 12A-12N, e.g. by not asserting the interrupt input to the target processor core 10A-10N during the delay.

In the illustrated embodiment, there is one IPICR and thus there may be one deferred interrupt delay per set of processor cores 10A-10N. In other embodiments, there may be one IPICR 20 per processor core 10A-10N, similar to the IPIRRs 14A-14N and IPISRs 16A-16N.

The retract type may be an IPI type that attempts to cancel a previously transmitted IPI. For example, software executing on a source processor core 10A-10N may transmit a deferred IPI to another processor core 10A-10N. If, during the time period that the deferred IPI is delayed, software determines that the IPI is no longer needed (e.g. the source processor core 10A-10N may complete the assigned task that caused the source processor core 10A-10N to request the deferred IPI), the retract IPI may be transmitted. If the target processor core has not yet been interrupted, the retract IPI may cancel the previously-transmitted deferred IPI, preventing the interrupt. In an embodiment, any previously-transmitted IPI from the source processor core 10A-10N to the target processor core 10A-10N may be cancelled using the retract IPI. In other embodiments, a subset of the IPI types may be cancellable using the retract IPI.

The non-waking type may be an IPI that may interrupt the target processor 10A-10N if the target processor 10A-10N is in a power state in which instructions are being executed, but which may be delayed if the target processor core 10A-10N is not in such a power state. The delay may continue until the target processor core 10A-10N returns to an instruction-executing power state. The cause of the target processor core 10A-10N returning to the instruction-executing power state may be independent of the non-waking IPI. That is, an event other than the arrival or request of the non-waking IPI may cause the return to the instruction-executing power state. For example, the return to the instruction-executing state may be based on the entry to the low power (non-instruction-executing) state. A delay may be set when the entry to the low power state is performed, for example, and the processor may be awakened when the delay expires. Alternatively, the wakeup may be triggered based on some other event or set of events in the system. The events may be selected and the triggering mechanism prepared prior to entering the low power state. For example, an external interrupt separate from the IPI may be used as the trigger when the event or events are detected.

There may be multiple power states in which the processor cores 10A-10N execute instructions and/or multiple power states in which the processor cores 10A-10N do not execute instructions. Different power states in which the processor cores 10A-10N execute instructions may include different performance levels (e.g. different operating frequencies and corresponding supply voltage settings, for example). Different power states in which the processor cores 10A-10N do not execute instructions (i.e. instructions are not executable in the state) may differ in the amount of delay that may occur prior to returning to instruction execution. For example, a first state may be clock gated but still powered on, so that restoring the clocks may permit continued execution. A second state may have the logic circuitry powered on, but the clock source is disabled (e.g. a phased locked loop (PLL), delay-locked loop (DLL), etc.), and continued execution may be delayed until the clock source re-synchronizes. A third state may have logic circuitry powered off, but may retain processor state so that the processor core 10A-10N need not reset prior to beginning execution. A fourth state may not retain processor state and a reset may be performed prior to initializing and beginning instruction execution. States in which instructions are not being executed/not executable may be referred to as sleep states, and the processor core may be referred to as "asleep" or "sleeping." If the processor core is in a state in which instructions are executing (or are at least executable, although pipeline stalls, memory latency, and the like may temporarily delay execution), the processor core may be referred to as "awake" or "active." The process of transition from a sleep state to an awake state may be referred to as waking the processor core.

In an embodiment, the retract IPI may retract either deferred or non-waking IPIs. In other embodiments, the retract IPI may only affect deferred IPIs, or only non-waking IPIs. In still other embodiments, the retract IPI may retract any IPI that has not yet caused an interrupt of the target processor core.

In the exploded view of the IPIRR 14A, shown in dotted form, is one implementation of a hardware register associated with the processor core 10A for IPIs. In one embodiment, there may be a similar hardware register associated with each processor core 10A-10N. The hardware register may not be software accessible. The hardware register may include a field for each other processor core 10A-10N, and may indicate if that processor core is attempting to interrupt the processor core associated with the register. For example, the field 26 in FIG. 1 may indicate whether or not the processor 10A-10N with CPUID number N is attempting to IPI the processor core 10A; and the field 28 may indicate whether or not the processor 10A-10N with CPUID number 0 is attempting to IPI the processor core 10A. There may be such a field for each processor core. In an embodiment, the field may also indicate the type of IPI (e.g. immediate, deferred, retract, or non-waking).

Based on the contents of the hardware registers, the IPI control circuits 10A-10N may attempt to IPI the corresponding processor cores 10A-10N. Additionally, a write to the IPIRR 14A-14N by a corresponding one of the processor cores 10A-10N may result in an update of the target processor core's hardware register.

The IPI control circuits 12A-12N are illustrated as coupled in FIG. 1. In some embodiments, a centralized IPI control circuit may be used with the IPIRRs 14A-14N and IPISRs 16A-16N located with the centralized IPI control circuit. For example, the centralized IPI control circuit may be located in an always-on area that remains powered even if one or more of the processor cores 10A-10N are powered down. The IPICR 20 may be located with the centralized IPI control circuit, which may include the CR control circuit 18 in such an embodiment.

In one embodiment, the IPIRRs 14A-14N, IPISRs 16A-16N, and IPICR may be coupled to an SPR "ring." Reads and writes of SPRs may be transmitted on the ring, and travel from source processor core 10A-10N to destination SPR (and back with data for SPR reads). Any interconnect which provides for processor core read and write of SPRs may be used in various embodiments.

The IPIRRs 14A-14N, the IPISRs 16A-16N, and the IPICR 20 may be special purpose registers. As opposed to general purpose registers, which may be specified as operands of most instructions (of a given arithmetic type) in an instruction set architecture, special purpose registers may generally be read/written by a specific read/write special purpose register instruction. Additionally, the contents of special purpose registers often indicate/control specific processor information or state. In some instruction set architectures, special purpose registers (SPRs) may include model specific registers (MSRs), whose definition may vary for different implementations of the instruction set architecture. Additionally, some SPRs are referred to as machine state registers in some instruction set architectures, since writing values in the SPRs can control the state of the machine (e.g. activating/deactivating various modes).

In an embodiment, the processor cores 10A-10N may be central processing units (CPUs) in a system including the processor cores 10A-10N. Generally, CPUs may execute the controlling software in the system (e.g. operating system software or other privileged software) and may control other components in the system such as peripherals. There may be embedded processors, microcontrollers, digital signal processors (DSPs), etc. throughout the system as well. While processor cores are used as an example herein, generally any type of processor may be used. A processor may include hardware circuitry designed to execute the instructions in an instruction set architecture implemented by the processor. The processor may include any microarchitecture, including in-order and out-of-order execution designs, speculative and non-speculative designs, pipelined and superpipelined designs, scalar and superscalar designs, etc. Various performance-enhancing features such as predictive structures, caches, etc. may be included in the processors. Processors may also include microcode. Processors may include stand-alone discrete microprocessors, processor cores integrated onto an integrated circuit with other circuitry, multi-core stand alone microprocessors, etc. Thus, while processor cores are used in this example, other embodiments may implement other types of processors.

Figure 2:
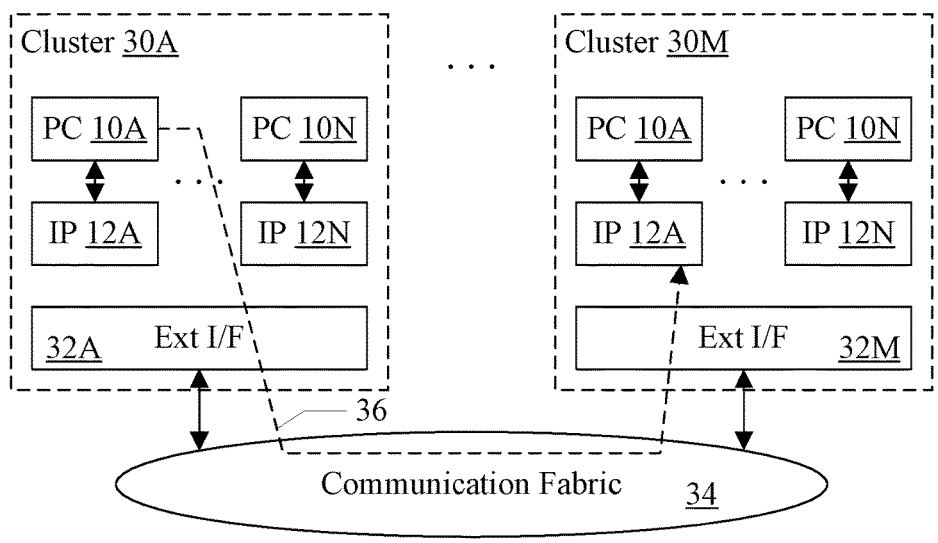
FIG. 2 is a block diagram of a system including more than one cluster.

The embodiment of FIG. 1 may be a processor cluster, which may be coupled as a unit into a larger system. The cluster may include, e.g., a common last level cache that is accessible to the processor cores. The cluster may include, e.g., a common interface to a system interconnect. Alternatively, some of the processor cores may be in one processor cluster while others may be in another processor cluster. FIG. 2 is an example of a system that includes multiple processor clusters 30A-30M. Each cluster may include instances of processor cores 10A-10N and corresponding IPI control circuits 12A-12N, although the number of processor cores in each cluster may vary and the number need not be the same from cluster to cluster.

An external interface circuit 32A-32M is illustrated in FIG. 2 as well. The external interface circuit 32A-32M may be part of a last level cache in the cluster 30A-30M. In other embodiments, the external interface circuit 32A-32M may be a standalone interface to the rest of the system over a communication fabric 34. For SPR writes to communicate IPIs between clusters, the IPI control circuits 12A-12N may detect the writes and convey them to the external interface circuits 32A-32M for communication over the fabric 34 to the other cluster 30A-30M. For example, the dotted line 36 in FIG. 2 illustrates a transmission of an SPR write to the IPIRR 12A of the processor core 10A in the cluster 32M from the processor core 10A in the cluster 32A.

Figure 3:
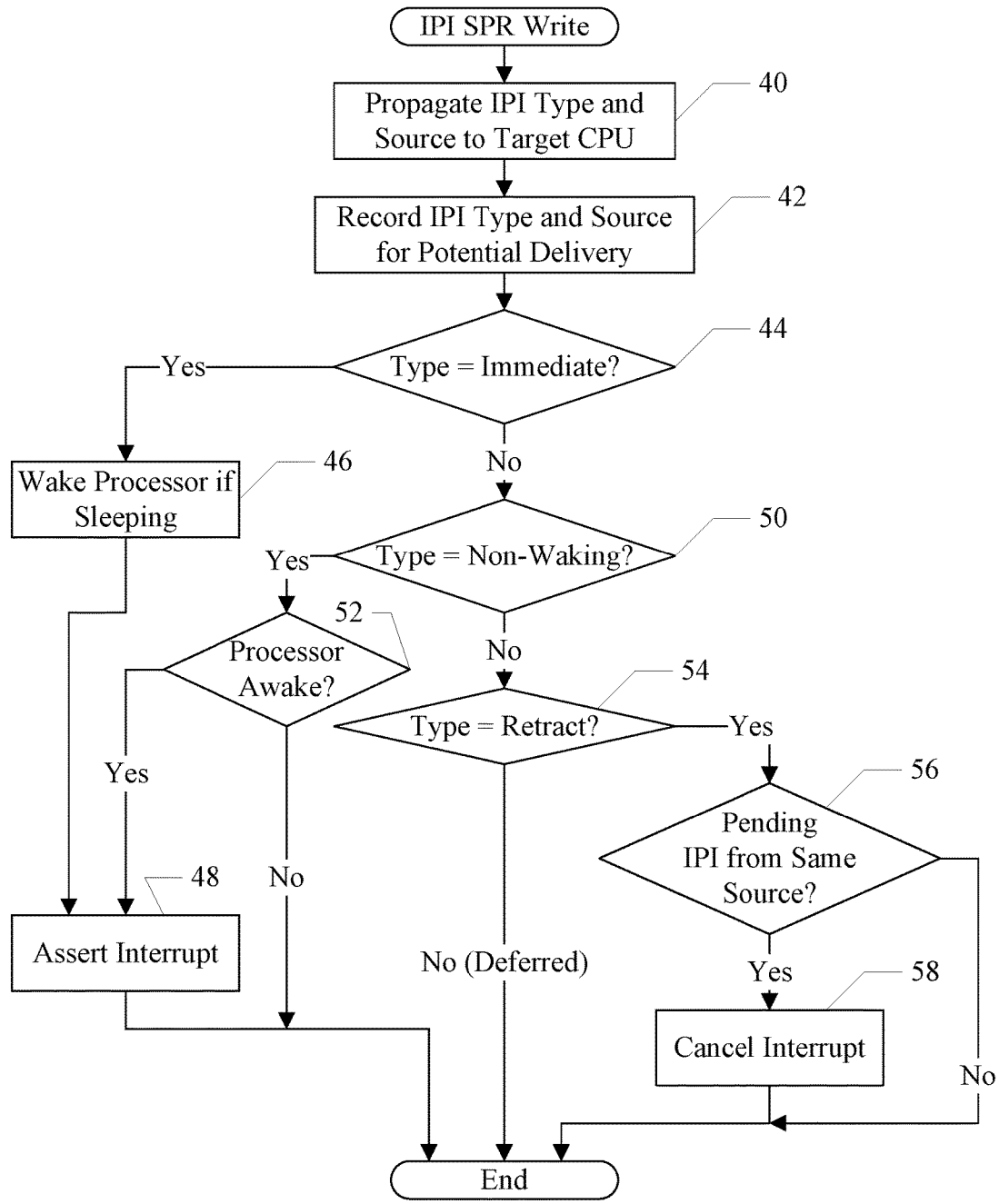
FIG. 3 is a flowchart illustrating operation of one embodiment of a processor core in response to an SPR write.

Turning next to FIG. 3, a flowchart is shown illustrating operation of one embodiment of the apparatus shown in FIGS. 1 and 2 for a write to the IPIRR 14A-14N from a corresponding processor core 10A-10N. While the blocks are shown in a particular order for ease of understanding, other orders may be used. Blocks may be performed in parallel by combinatorial logic in the apparatus. Blocks, combinations of blocks, and/or the flowchart as a whole may be pipelined over multiple clock cycles. The apparatus as shown in FIGS. 1 and 2 may be configured to implement the operation illustrated in FIG. 3.

The IPI control circuit 12A-12N that receives the IPIRR write from the source processor core 10A-10N may be configured to propagate the IPI (including type and source processor core identifier) to the IPI control circuit 12A-12N associated with the target processor core 10A-10N (more briefly, the "target IPI control circuit"—block 40). The target IPI control circuit may be configured to record the IPI type and source processor identifier in the hardware register associated with the IPIRR (e.g. in one of the fields such as 26 or 28 shown in FIG. 1) for potential delivery to the target processor core 10A-10N (block 42). The source identifier may be implicit in which field of the hardware register is updated with the IPI type, and thus may not be explicitly stored. The target IPI control circuit may also take additional action based on the IPI type.

If the IPI type is immediate (decision block 44, "yes" leg), the target IPI control circuit may be configure to cause a wake up of the target processor core, if the processor core is sleeping (block 46) and may assert the interrupt to the target processor core 10A-10N (block 48). If the IPI type is non-waking (decision block 50, "yes" leg) and the target processor core 10A-10N is awake (decision block 52, "yes" leg), the target IPI circuit may be configured to assert the interrupt to the target processor core. On the other hand, if the IPI type is non-waking (decision block 50, "yes" leg) and the target processor core 10A-10N is sleeping (decision block 52, "no" leg), the interrupt may be delayed until the target processor core wakes. If the IPI type is retract (decision block 54, "yes" leg) and there is a pending IPI from the same source processor (decision block 56, "yes" leg), the target IPI control circuit may be configured to cancel the pending IPI (block 58). Cancelling the IPI may involve invalidating the field in the hardware register associated with the IPIRR (e.g. resetting a valid bit, overwriting the field with zero, etc.). In some embodiments, the retract IPI may cancel only certain types of IPIs (e.g. deferred, or non-waking, or both). In such embodiments, the type may be checked as well to ensure that only the correct types are cancelled. If the IPI type is deferred (decision blocks 44, 50, and 54, no legs), the interrupt may be delayed up until the expiration of the associated delay interval. In some cases, the interrupt may be asserted earlier than the expiration of the associated delay, as discussed previously.

Figure 4:
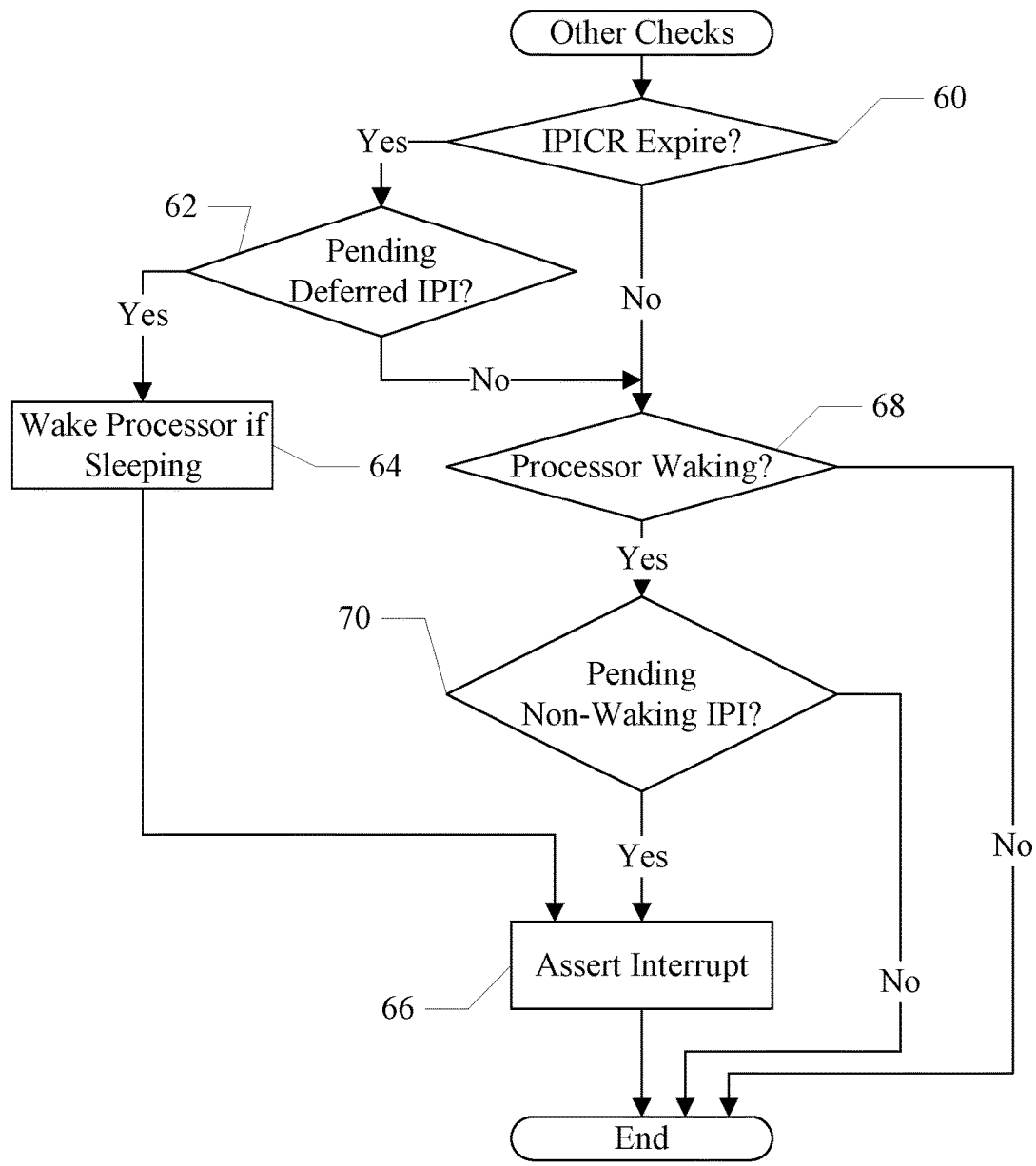
FIG. 4 is a flowchart illustrating one embodiment of other IPI-related events.

Turning now to FIG. 4, a flowchart is shown illustrating operation of one embodiment of the apparatus shown in FIGS. 1 and 2 that may be performed on an ongoing basis in the apparatus (e.g. not necessarily triggered by an event from the processor cores 10A-10N). While the blocks are shown in a particular order for ease of understanding, other orders may be used. Blocks may be performed in parallel by combinatorial logic in the apparatus. Blocks, combinations of blocks, and/or the flowchart as a whole may be pipelined over multiple clock cycles. The apparatus as shown in FIGS. 1 and 2 may be configured to implement the operation illustrated in FIG. 4.

If the IPICR counter expires (decision block 60, "yes" leg) and there is a pending deferred IPI for one or more of the processor cores 10A-10N (decision block 62, "yes" leg), the corresponding IPI control circuit 12A-12N may be configured to cause the target processor core 10A-10N to awaken if it is sleeping (block 64) and may be configured to assert the interrupt to the target processor core 10A-10N (block 66). If a given processor core 10A-10N is waking (responsive to an event other than an IPI) (decision block 68, "yes" leg) and the corresponding IPI control circuit 12A-12N has a pending non-waking IPI for the given processor core (decision block 70, "yes" leg), the corresponding IPI control circuit 12A-12N may assert the interrupt to the given processor core (block 66).

Figure 5:
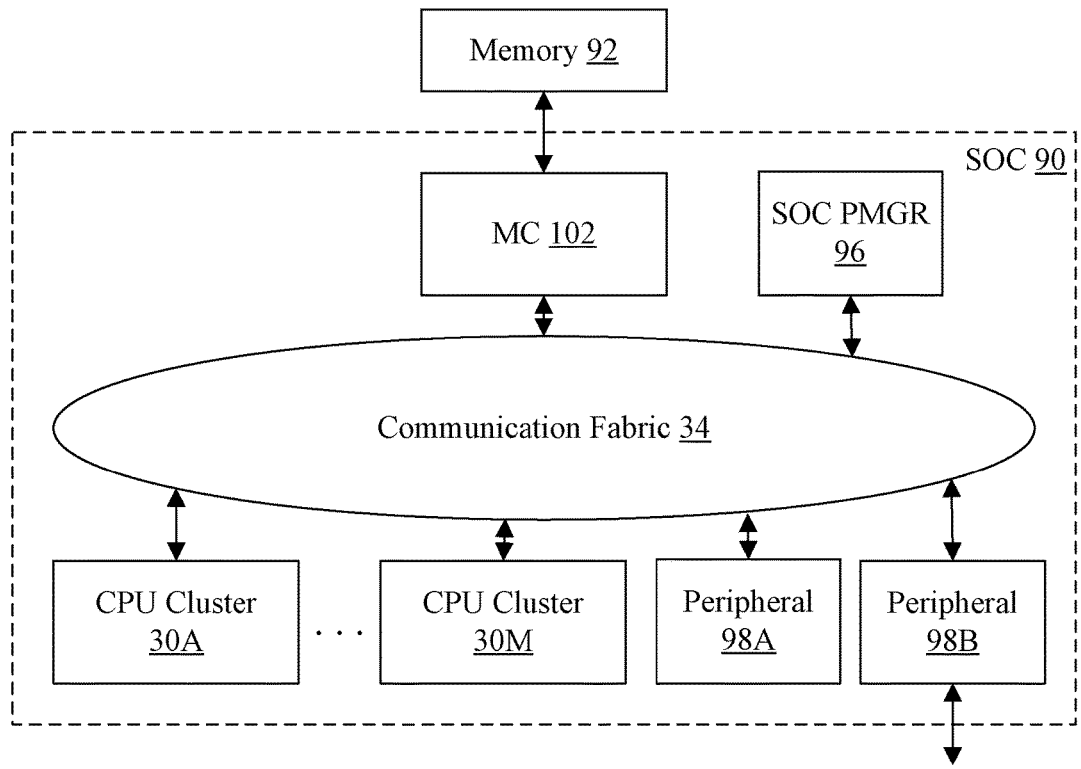
FIG. 5 is a block diagram of one embodiment of a system on a chip.

FIG. 5 is a block diagram of one embodiment of an SOC 90 coupled to a memory 92. As implied by the name, the components of the SOC 90 may be integrated onto a single semiconductor substrate as an integrated circuit "chip." In some embodiments, the components may be implemented on two or more discrete chips in a system. However, the SOC 90 will be used as an example herein. In the illustrated embodiment, the components of the SOC 90 include processor clusters 30A-30M as the CPUs in the SOC 90, illustrated in FIG. 5 as the CPU clusters 30A-30M. In the illustrated embodiment, components of the SOC 90 further include peripheral components 98A-98B (more briefly, "peripherals" 98), a memory controller 102, an SOC power manager (PMGR) 96, and a communication fabric 34. The components 30A-30M, 916, 98A-98B, and 102 may all be coupled to the communication fabric 34. The memory controller 102 may be coupled to the memory 92 during use.

The memory controller 102 may generally include the circuitry for receiving memory operations from the other components of the SOC 90 and for accessing the memory 92 to complete the memory operations. The memory controller 102 may be configured to access any type of memory 92. For example, the memory 92 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 102 may include queues for memory operations, for ordering (and potentially reordering) the operations and presenting the operations to the memory 92. The memory controller 102 may further include data buffers to store write data awaiting write to memory and read data awaiting return to the source of the memory operation. In some embodiments, the memory controller 102 may include a memory cache to store recently accessed memory data. In SOC implementations, for example, the memory cache may reduce power consumption in the SOC by avoiding reaccess of data from the memory 92 if it is expected to be accessed again soon. In some cases, the memory cache may also be referred to as a system cache, as opposed to private caches such as the shared cache or caches in the processors, which serve only certain components. Additionally, in some embodiments, a system cache need not be located within the memory controller 102.

The peripherals 98A-98B may be any set of additional hardware functionality included in the SOC 90. For example, the peripherals 98A-98B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 90 (e.g. the peripheral 98B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 34 may be any communication interconnect and protocol for communicating among the components of the SOC 90. The communication fabric 34 may be bus-based, including shared bus configurations, cross bar configurations, and hierarchical buses with bridges. The communication fabric 34 may also be packet-based, and may be hierarchical with bridges, cross bar, point-to-point, or other interconnects.

The SOC PMGR 96 may be configured to control the supply voltage magnitudes requested from the PMU in the system. There may be multiple supply voltages generated by the PMU for the SOC 90. For example, the a voltage may be generated for the processor cores 12A-12N in the CPU clusters 30A-30M, and another voltage may be generated for other components in the SOC 90. In an embodiment, the other voltage may serve the memory controller 102, the peripherals 18, the SOC PMGR 96, and the other components of the SOC 90 and power gating may be employed based on power domains. There may be multiple supply voltages for the rest of the SOC 90, in some embodiments. In some embodiments, there may also be a memory supply voltage for various memory arrays in the CPU clusters 30A-30M and/or the SOC 90. The memory supply voltage may be used with the voltage supplied to the logic circuitry, which may have a lower voltage magnitude than that required to ensure robust memory operation. The SOC PMGR 96 may be under direct software control (e.g. software may directly request the power up and/or power down of components) and/or may be configured to monitor the SOC 90 and determine when various components are to be powered up or powered down. For the CPU clusters 30A-30M, the voltage requests may be provided to the SOC PMGR 96, which may communicate the requests to the PMU to effect the change in supply voltage magnitudes.

It is noted that the number of components of the SOC 90 may vary from embodiment to embodiment. There may be more or fewer of each component/subcomponent than the number shown in FIG. 5.

Figure 6:
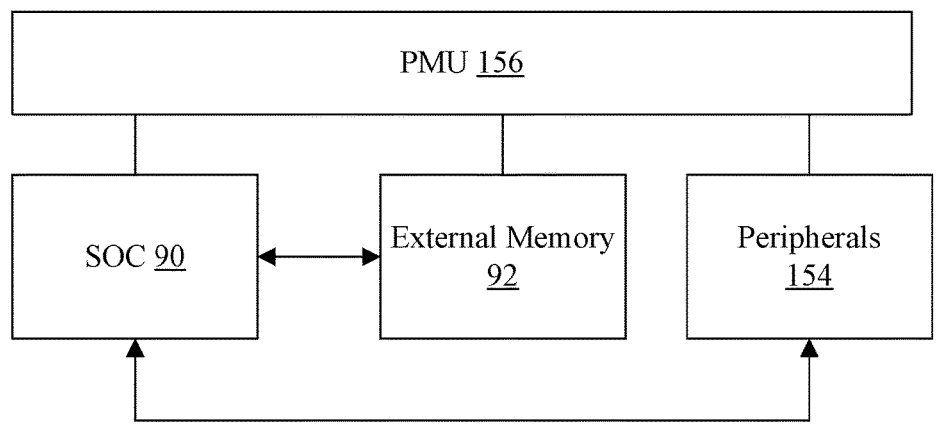
FIG. 6 is a block diagram of one embodiment of the SOC shown in FIG. 5.

Turning next to FIG. 6, a block diagram of one embodiment of a system 150 is shown. In the illustrated embodiment, the system 150 includes at least one instance of the SOC 90 coupled to one or more peripherals 154 and the external memory 92. The PMU 156 is provided which supplies the supply voltages to the SOC 90 as well as one or more supply voltages to the memory 92 and/or the peripherals 154. In some embodiments, more than one instance of the SOC 90 may be included (and more than one memory 92 may be included as well).

The PMU 156 may generally include the circuitry to generate supply voltages and to provide those supply voltages to other components of the system such as the SOC 90, the memory 92, various off-chip peripheral components 154 such as display devices, image sensors, user interface devices, etc. The PMU 156 may thus include programmable voltage regulators, logic to interface to the SOC 90 and more particularly the SOC PMGR 96 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wife, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 92 may include any type of memory. For example, the external memory 92 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 92 may include one or more memory modules to which the memory devices are mounted, such as single inline memory modules (SIMMs), dual inline memory modules (DIMMs), etc. Alternatively, the external memory 92 may include one or more memory devices that are mounted on the SOC 90 in a chip-on-chip or package-on-package implementation.

FIG. 7 is a block diagram of one embodiment of a computer accessible storage medium 160 storing an electronic description of a given processor core 10A-10N (reference numeral 162). Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the processor core 10A-10N stored on the computer accessible storage medium 160 may be a database which can be read by a program and used, directly or indirectly, to fabricate the hardware comprising the processor 102. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor core 10A-10N. The netlist may then be placed and routed to produce a data set describing geometric shapes to be applied to masks. The masks may then be used in various semiconductor fabrication steps to produce a semiconductor circuit or circuits corresponding to the processor core 10A-10N. Alternatively, the description 162 on the computer accessible storage medium 160 may be the netlist (with or without the synthesis library) or the data set, as desired.

While the computer accessible storage medium 160 stores a description 162 of the processor core 10A-10N, other embodiments may store a description 162 of any portion of the processor core 10A-10N, as desired. The description 162 may be of the processor core 10A-10N and other components of the SOC 90 and/or the system 150, as well, including up to all of the SOC 90 and/or the system 100, in still other embodiments.

Numerous variations and modifications will become apparent to those skilled in the art once the above disclosure is fully appreciated. It is intended that the following claims be interpreted to embrace all such variations and modifications.

What is claimed is:

1. An apparatus comprising:
 a plurality of processors;
 a plurality of registers coupled to the plurality of processors, wherein a first register of the plurality of registers corresponds to a first processor of the plurality of processors, and wherein the first processor is configured to request an interprocessor interrupt (IPI) for a second processor of the plurality of processors responsive to executing an instruction which writes the first register with an identifier indicating the second processor, and wherein the first register further includes a type field defining a type of the IPI; and at least one control circuit coupled to the plurality of registers, wherein the control circuit is configured to control interruption of the second processor for IPIs, and wherein, if the IPI is a retract type and there is a second IPI previously transmitted by the first processor for the second processor that has not yet interrupted the second processor, the control circuit is configured to cancel the second IPI in response to the retract IPI.

2. The apparatus as recited in claim 1, wherein the second IPI is a deferred type that is defined to interrupt the second processor no later than an expiration of a specified time interval after it arrives at the second processor.

3. The apparatus as recited in claim 2, wherein the specified time interval is measured by a timer that is initialized in response to transmission of the second IPI having the deferred type.

4. The apparatus as recited in claim 1, wherein the second IPI is a non-waking type, and wherein the control circuit is configured to interrupt the second processor if it is awake but to delay interruption if the second processor is sleeping until the second processor is awakened.

5. The apparatus as recited in claim 4, wherein the second processor is awakened for an event other than the second IPI.

6. The apparatus as recited in claim 1, wherein the first processor and the second processor are located in a first processor cluster.

7. The apparatus as recited in claim 1, wherein the first processor is in a first processor cluster and the second processor is in a second processor cluster.

8. A system comprising:
a plurality of processors serving as central processing units (CPUs) for the system, wherein a first processor of the plurality of processors is configured to interrupt a second processor of the plurality of processors using a first interprocessor interrupt (IPI);
at least one control circuit coupled to the plurality of processors, wherein the control circuit is configured to control interruption of the second processor for IPIs, and wherein, if the first processor transmits a retract IPI after transmitting the first IPI and the control circuit has not yet interrupted the second processor for the first IPI, the control circuit is configured to cancel the first IPI in response to the retract IPI.

9. The system as recited in claim 8, further comprising a plurality of registers coupled to the plurality of processors, wherein a first register of the plurality of registers corresponds to the first processor, and wherein the first processor is configured to request the first IPI responsive to executing a first instruction which writes the first register with an identifier indicating the second processor, and wherein the first register further includes a type field defining a type of the IPI, and wherein the first processor is configured to write the type to indicate the retract IPI and the identifier indicating the second processor responsive to executing a second instruction which writes the first register.

10. The system as recited in claim 8, wherein a type of the first IPI is deferred, and wherein the control circuit is configured to interrupt the second processor for the first IPI no later than an expiration of a specified time interval after the first IPI arrives at the second processor.

11. The system as recited in claim 8, wherein a type of the first IPI is non-waking, and wherein the control circuit is configured to interrupt the second processor if it is awake but to delay interruption if the second processor is sleeping until the second processor is awakened.

12. The system as recited in claim 11, wherein the second processor is awakened for an event other than the first IPI.

13. The system as recited in claim 8, wherein a type of the first IPI is deferred, and wherein the control circuit is configured to interrupt the second processor for the first IPI no later than an expiration of a specified time interval after the first IPI arrives at the second processor, and wherein the specified time interval is measured by a timer that is initialized in response to transmission of the deferred type.

14. A method comprising:
transmitting, by a first processor of a plurality of processors serving as central processing units (CPUs) for a system, a first interprocessor interrupt (IPI) to interrupt a second processor of the plurality of processors;
transmitting, by the first processor, a retract IPI after transmitting the first IPI; and
responsive to the retract IPI arriving prior to interrupting the second processor in response to the first IPI, canceling the first IPI.

15. The method as recited in claim 14 wherein the system includes a plurality of registers coupled to the plurality of processors, wherein a first register of the plurality of registers corresponds to the first processor, and transmitting the first IPI comprises:
writing the first register with an identifier indicating the second processor and a type field of the first register with a type of the IPI.

16. The method as recited in claim 15 where transmitting the retract IPI comprises:
writing the type to indicate the retract IPI and the identifier indicating the second processor responsive to executing a second instruction which writes the first register.

17. The method as recited in claim 14, wherein a type of the first IPI is deferred, and wherein the second processor is interrupted for the first IPI no later than an expiration of a specified time interval after the first IPI arrives at the second processor.

18. The method as recited in claim 17 further comprising:
initializing a timer to measure the specified time interval in response to transmission of the deferred type.

19. The method as recited in claim 14, wherein a type of the first IPI is non-waking, and the method further comprises:
delaying interruption of the second processor responsive to the second processor being asleep when the first IPI arrives, the delaying continuing until the second processor is awakened; and
awakening the second processor for an event other than the first IPI.

* * * * *